United States Patent
Weng et al.

(10) Patent No.: US 7,490,980 B2
(45) Date of Patent: Feb. 17, 2009

(54) METHOD FOR CALIBRATING INFRARED THERMOMETER

(75) Inventors: Vincent Weng, HsinChu (TW); Jason Liao, HsinChu (TW); James Huang, HsinChu (TW)

(73) Assignee: Radiant Innovation Inc., Hsinchu (TW)

( * ) Notice: Subject to any disclaimer, the term of this patent is extended or adjusted under 35 U.S.C. 154(b) by 0 days.

(21) Appl. No.: 12/068,133

(22) Filed: Feb. 4, 2008

(65) Prior Publication Data

US 2008/0192798 A1    Aug. 14, 2008

(30) Foreign Application Priority Data

Feb. 9, 2007    (TW) .............. 96104781 A

(51) Int. Cl.
*G01K 15/00*    (2006.01)
(52) U.S. Cl. .............. 374/2; 374/121; 702/99; 702/104
(58) Field of Classification Search ............ 374/2, 374/121; 702/99, 104
See application file for complete search history.

(56) References Cited

U.S. PATENT DOCUMENTS 5,464,284 A * 11/1995 Rall ................. 374/131
6,065,866 A   5/2000 Kraus et al.
7,297,938 B2 * 11/2007 Fauci et al. ............ 250/252.1

* cited by examiner

*Primary Examiner*—Edward Lefkowitz
*Assistant Examiner*—Mirellys Jagan
(74) *Attorney, Agent, or Firm*—Rosenberg, Klein & Lee

(57) ABSTRACT

The present invention discloses a method for calibrating an infrared thermometer, which can obtain a sensitivity of a radiation sensor of an infrared thermometer and a reference resistance of an ambient-temperature sensor of the infrared thermometer. The method of the present invention uses an infrared thermometer to detect two test objects respectively placed in two environments having different ambient temperatures to obtain output signals of the radiation sensor and resistances of the ambient-temperature sensor from the two test objects. Then, the method of the present invention uses the output signals of the radiation sensor and the resistances of the ambient-temperature sensor to work out the sensitivity of the radiation sensor and the reference resistance of the ambient-temperature sensor.

5 Claims, 1 Drawing Sheet

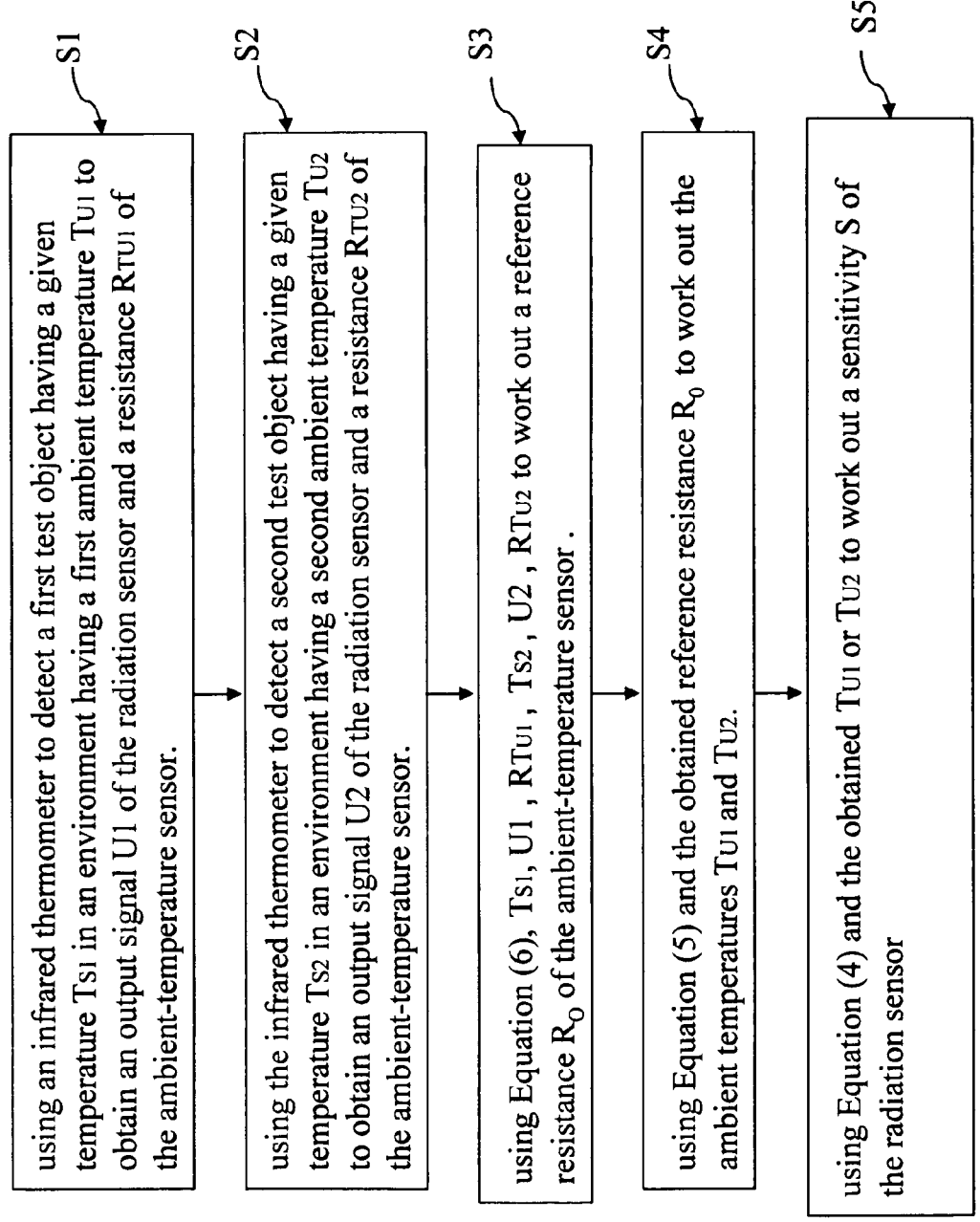

METHOD FOR CALIBRATING INFRARED THERMOMETER

BACKGROUND OF THE INVENTION

1. Field of the Invention

The present invention relates to a method for calibrating an infrared thermometer, particularly to a method for calibrating an infrared thermometer at different ambient temperatures.

2. Description of the Related Art

U.S. Pat. No. 6,065,866 discloses a method for calibrating an infrared thermometer. In this prior art, an infrared thermometer detects two black bodies 1 and 2, which respectively have given temperatures Ts(1) and Ts(2), at an identical ambient temperature Tu, and then the radiation sensor of the infrared thermometer outputs signals U(1) and U(2). Thus, the sensitivity S of the radiation sensor can be obtained from Equation (1):

$$T_s(1)^4 = \frac{U(1)}{S} + T_U^4 \qquad (1)$$

$$T_s(2)^4 = \frac{U(2)}{S} + T_U^4$$

and the value of the sensitivity S of the radiation sensor is $$\frac{U(2) - U(1)}{Ts(2)^4 - Ts(1)^4}$$

Then, the values of the ambient temperature Tu can be further obtained from Equation (1).

Infrared thermometers are very sensitive to ambient temperature. For example, when the measurement accuracy of an infrared ear thermometer is ±0.2° C., the variation of ambient temperature ΔTu should be limited to within ±0.2° C. or the accuracy of the infrared ear thermometer will be influenced. However, maintaining a constant ambient temperature is very difficult. For example, when the door is open and close for someone entering or leaving an air-conditioned room, the temperature will be influenced. Further, each person entering or leaving the room has his own body temperature. Therefore, limiting the variation of ambient temperature ΔTu to within ±0.2° C. is very difficult. Only by investing much money in related equipment can it be achieved.

Accordingly, the present invention proposes a new method for calibrating an infrared thermometer to overcome the above-mentioned problems.

SUMMARY OF THE INVENTION

One objective of the present invention is to provide a method for calibrating an infrared thermometer, wherein two test objects are respectively placed in environments having different ambient temperatures and detected by an infrared thermometer, and different output signals of the radiation sensor of the infrared thermometer and different resistances of the ambient-temperature sensor of the infrared thermometer are obtained from the two test objects, and the sensitivity of the radiation sensor and the reference resistance of the ambient-temperature sensor are worked out from the output signals and resistances.

Another objective of the present invention is to provide a method for calibrating an infrared thermometer, which is free of the limitation of an identical ambient temperature and can work at different ambient temperatures without investing much money in temperature-control equipment.

The method for calibrating an infrared thermometer proposed by the present invention is to generate a sensitivity value S of the radiation sensor of an infrared thermometer and a reference resistance value $R_O$ of the ambient-temperature sensor of the infrared thermometer. In the method of the present invention, an infrared thermometer first detects a first test object having a given temperature Ts1 placed in an environment having an ambient temperature Tu1 and obtains the output signal U1 of the radiation sensor of the infrared thermometer and the resistance RTu1 of the ambient-temperature sensor of the infrared thermometer. Then, the infrared thermometer detects a second test object having a given temperature Ts2 placed in an environment at an ambient temperature Tu2 and obtains the output signal U2 of the radiation sensor of the infrared thermometer and the resistance RTu2 of the ambient-temperature sensor of the infrared thermometer. Then, the given values or obtained values, of the first test object temperature Ts1, the second test object temperature Ts2, the output signal U1, the output signal U2, the resistance RTu1 and the resistance RTu2, are substituted into the following equation:

$$T_{U2}^4 - \frac{U2}{U1}T_{U1}^4 + \frac{U2}{U1}T_{S1}^4 - T_{S2}^4 = 0$$

wherein $$T_{U1} = \frac{1}{a + b \cdot \ln\left(\frac{R_{T_{U1}}}{R_0}\right) + c\left[\ln\left(\frac{R_{T_{U1}}}{R_0}\right)\right]^3},$$

$$T_{U2} = \frac{1}{a + b \cdot \ln\left(\frac{R_{T_{U2}}}{R_0}\right) + c\left[\ln\left(\frac{R_{T_{U2}}}{R_0}\right)\right]^3},$$

and a, b and c are temperature coefficients. Thereby, the reference resistance value $R_O$ of the ambient-temperature sensor can be worked out. Next, the reference resistance value $R_O$ is used to calculate the ambient temperatures Tu1 and Tu2. Then, the ambient temperatures Tu1 and Tu2 is used to work out the sensitivity S of the radiation sensor.

Below, the embodiments are described in detail in cooperation with the attached drawings to make easily understood the objectives, technical contents, characteristics and accomplishments of the present invention.

BRIEF DESCRIPTION OF THE DRAWINGS

The FIGURE is a flowchart of a method for calibrating an infrared thermometer according to the present invention.

DETAILED DESCRIPTION OF THE INVENTION

An infrared thermometer has a radiation sensor and an ambient-temperature sensor, and a method for calibrating an infrared thermometer according to the present invention is to obtain the sensitivity S of the radiation sensor and the reference resistance $R_O$ of the ambient-temperature sensor, wherein the reference resistance $R_O$ is the resistance at an ambient temperature of 25° C., i.e. to obtain these two calibrated parameters, S and $R_O$.

Refer to the FIGURE, a flowchart of a method for calibrating an infrared thermometer according to the present invention. In preparation for the method of the present invention, a first test object having a given temperature Ts1 and a second test object having a given temperature Ts2 are provided, and the first and second test objects are respectively placed in two environments having different ambient temperatures, wherein the first test object is placed in an environment having a first ambient temperature Tu1, and the second test object is placed in an environment having a second ambient temperature Tu2. In Step S1, an infrared thermometer detects the first test object having the given temperature Ts1 in the environment having the first ambient temperature Tu1 to obtain the output signal U1 of the radiation sensor and the resistance RTu1 of the ambient-temperature sensor. In Step S2, the infrared thermometer detects the second test object having the given temperature Ts2 in the environment having the second ambient temperature Tu2 to obtain the output signal U2 of the radiation sensor and the resistance RTu2 of the ambient-temperature sensor.

In Step S3, the given values or the values obtained in Step S1 and Step S2 are substituted into Equation (2):

$$T_S^4 = T_U^4 + \frac{U}{S} \quad (2)$$

wherein Ts denotes the temperature of a test object, Tu denotes an ambient temperature, U denotes an output signal of the radiation sensor, and S denotes a sensitivity of the radiation sensor. Substituting into Equation (2) the given values or the values obtained in Step S1 and Step S2 will obtain Equation (3):

$$T_{S1}^4 = T_{U1}^4 + \frac{U1}{S} \quad (3)$$

$$T_{S2}^4 = T_{U2}^4 + \frac{U2}{S}$$

From Equation (3) is worked out the sensitivity S of the radiation sensor:

$$S = \frac{U1}{T_{S1}^4 - T_{U1}^4} = \frac{U2}{T_{S2}^4 - T_{U2}^4} \quad (4)$$

The first ambient temperature Tu1 and the second ambient temperature Tu2 may be expressed by Equation (5):

$$T_{U1} = \frac{1}{a + b \cdot \ln\left(\frac{R_{T_{U1}}}{R_0}\right) + c\left[\ln\left(\frac{R_{T_{U1}}}{R_0}\right)\right]^3} = T_U(R_{T_{U1}}, R_0) \quad (5)$$

$$T_{U2} = \frac{1}{a + b \cdot \ln\left(\frac{R_{T_{U2}}}{R_0}\right) + c\left[\ln\left(\frac{R_{T_{U2}}}{R_0}\right)\right]^3} = T_U(R_{T_{U2}}, R_0)$$

wherein a, b and c are temperature coefficients of sensors, which are provided by the manufacturer. Then, Equation (5) is substituted into Equation (4) to obtain Equation (6):

$$T_U(R_{T_{U2}}, R_0)^4 - \frac{U2}{U1} T_U(R_{T_{U1}}, R_0)^4 + \frac{U2}{U1} T_{S1}^4 - T_{S2}^4 = 0 \quad (6)$$

According to from Step S3 to Step S5 shown in FIG. 1 sequentially, a numerical analysis method, such as the Newton's method, the bisection method, or the secant method, is used to obtain the reference resistance $R_O$ of the ambient-temperature sensor. Next, the reference resistance $R_O$ is substituted into Equation (5) to obtain the first ambient temperature Tu1 and the second ambient temperature Tu2. Then, the obtained values of the first and second ambient temperatures Tu1 and Tu2 are substituted into Equation (4) to obtain the sensitivity S of the radiation sensor.

In conclusion, the present invention proposed a method for calibrating an infrared thermometer, which can perform calibration in the environments having different ambient temperatures to obtain the sensitivity S of the radiation sensor and the reference resistance $R_O$ of the ambient-temperature sensor—the parameters needing calibration. Thus is overcome the conventional problem that an infrared thermometer must be calibrated at an identical ambient temperature, and also is saved the investment in the expensive temperature-control equipment.

The embodiments described above are only to demonstrate the characteristics and technical thoughts of the present invention to enable the persons skilled in the art to understand, make, and use the present invention. However, it is not intended to limit the scope of the present invention. Any equivalent modification or variation according to the spirit of the present invention is to be also included within the scope of the present invention.

What is claimed is:

1. A method for calibrating an infrared thermometer, which obtains a sensitivity S of a radiation sensor of an infrared thermometer and a reference resistance $R_O$ of an ambient-temperature sensor of said infrared thermometer, comprising steps:

using said infrared thermometer to detect a first test object having a first given temperature Ts1 in an environment having a first ambient temperature Tu1 to obtain a first output signal U1 of said radiation sensor and a first resistance RTu1 of said ambient-temperature sensor;

using said infrared thermometer to detect a second test object having a second given temperature Ts2 in an another environment having a second ambient temperature Tu2 to obtain a second output signal U2 of said radiation sensor and a second resistance RTu2 of said ambient-temperature sensor; and using said first given temperature Ts1, said second given temperature Ts2, said first output signal U1, said second output signal U2, said first resistance RTu1, and said second resistance RTu2 to work out said reference resistance $R_O$ of said ambient-temperature sensor, and using said reference resistance $R_O$ to work out said first ambient temperature Tu1 and said second ambient temperature Tu2, and using said first ambient temperature Tu1 and said second ambient temperature Tu2 to work out said sensitivity S of said radiation sensor.

2. The method for calibrating an infrared thermometer according to claim 1, wherein said reference resistance $R_O$ is worked out from an equation:

$$T_{U2}^4 - \frac{U2}{U1}T_{U1}^4 + \frac{U2}{U1}T_{S1}^4 - T_{S2}^4 = 0,$$

wherein $$T_{U1} = \frac{1}{a + b \cdot \ln\left(\frac{R_{T_{U1}}}{R_0}\right) + c\left[\ln\left(\frac{R_{T_{U1}}}{R_0}\right)\right]^3}, \text{ and}$$

$$T_{U2} = \frac{1}{a + b \cdot \ln\left(\frac{R_{T_{U2}}}{R_0}\right) + c\left[\ln\left(\frac{R_{T_{U2}}}{R_0}\right)\right]^3}, \text{ and}$$

wherein Tu1 denotes said first ambient temperature, Tu2 denotes said second ambient temperature, Ts1 denotes said first given temperature, Ts2 denotes said second temperature, U1 denotes said first output signal, U2 denotes said second output signal, RTu1 denotes said first resistance, RTu2 denotes said second resistance, $R_O$ denotes said reference resistance and a, b and c are known temperature coefficients.

3. The method for calibrating an infrared thermometer according to claim 2, wherein said reference resistance $R_O$ is worked out with a Newton's method or a bisection method.

4. The method for calibrating an infrared thermometer according to claim 1, wherein said reference resistance $R_O$ is a resistance at a given ambient temperature.

5. The method for calibrating an infrared thermometer according to claim 4, wherein said given ambient temperature is 25° C.

* * * * *